Feb. 1, 1966 D. A. GERARD 3,232,526
HAND OPERATED TAPE PUNCHING MACHINE
Filed April 4, 1963 3 Sheets-Sheet 1
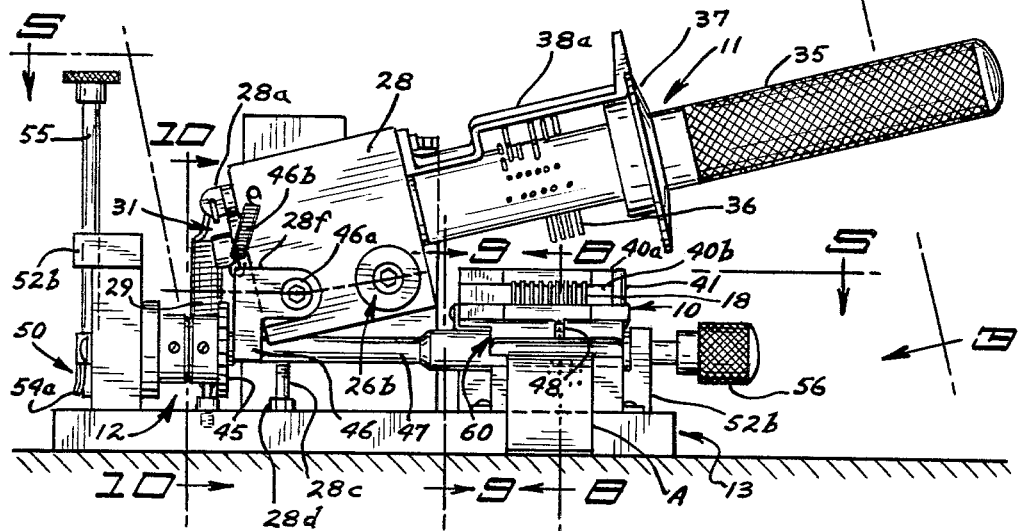
FIG. 1
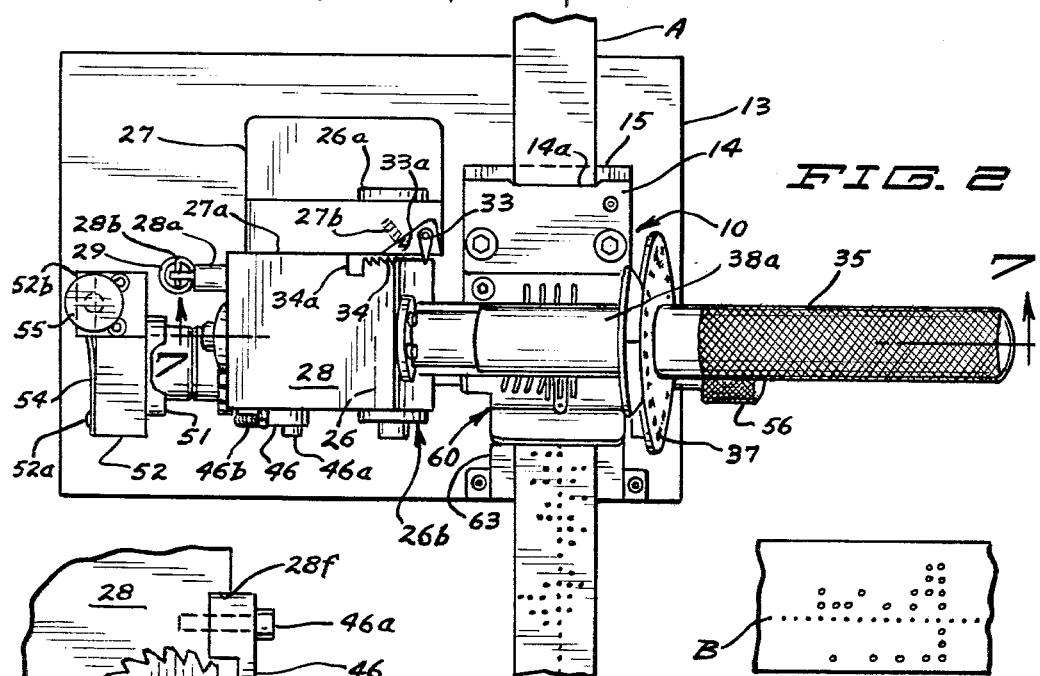
FIG. 2
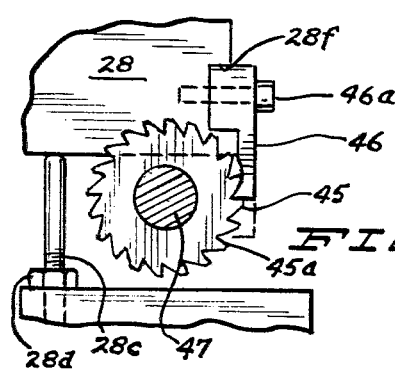
FIG. 10
FIG. 11
INVENTOR.
DERYCK A. GERARD
BY John W. Adams
ATTORNEY Feb. 1, 1966  D. A. GERARD  3,232,526
HAND OPERATED TAPE PUNCHING MACHINE
Filed April 4, 1963  3 Sheets-Sheet 2
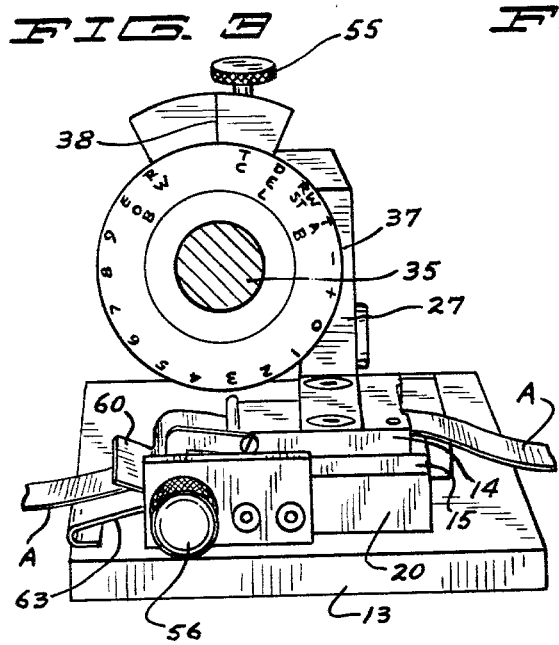
FIG. 3
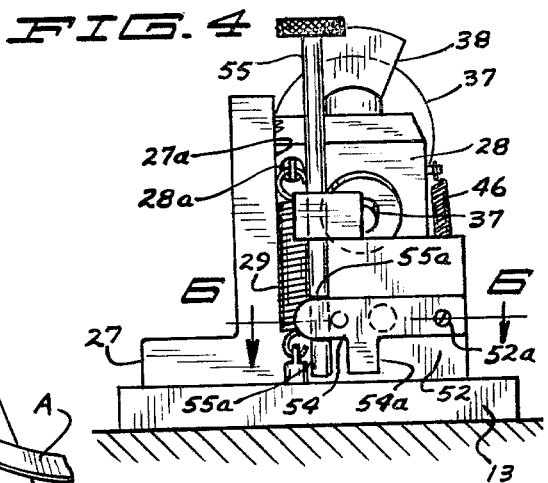
FIG. 4
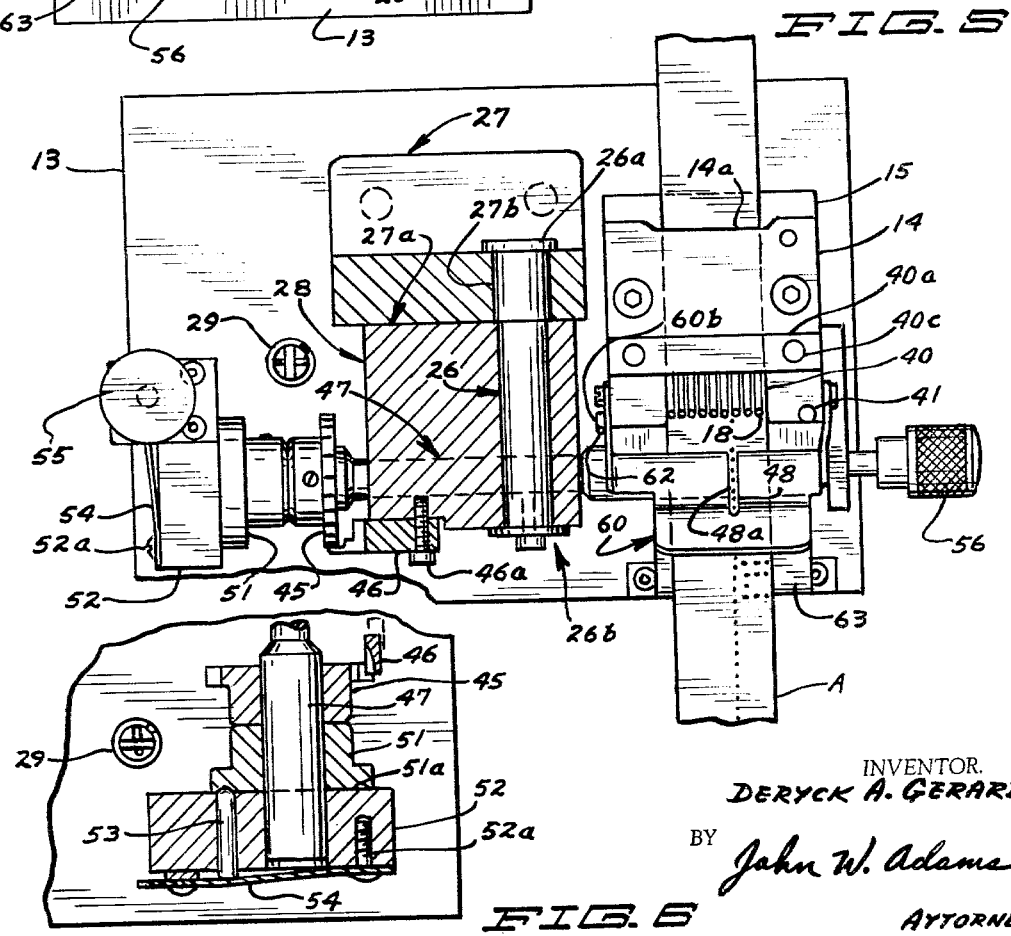
FIG. 5
FIG. 6
INVENTOR.
DERYCK A. GERARD
BY John W. Adams
ATTORNEY

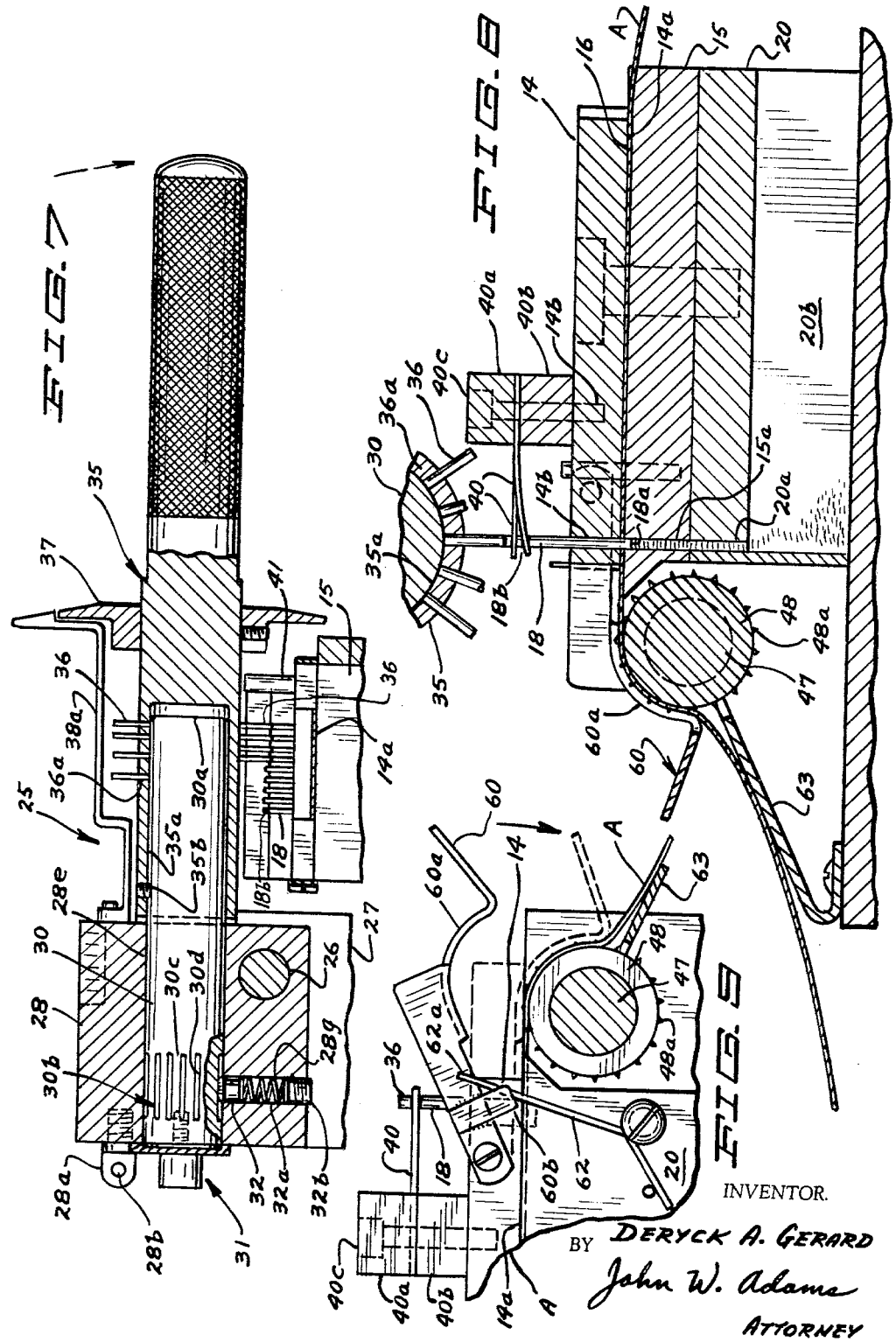

United States Patent Office 3,232,526
Patented Feb. 1, 1966

3,232,526
HAND OPERATED TAPE PUNCHING MACHINE
Deryck A. Gerard, Minneapolis, Minn., assignor to
H. & B., Inc., Minneapolis, Minn., a corporation
of Minnesota
Filed Apr. 4, 1963, Ser. No. 270,760
6 Claims. (Cl. 234—100)

This invention relates generally to tape punching apparatus and more specifically to a hand-operated tape punching machine for punching tape used to control tape-controlled machinery.

In recent years electronic control systems have been developed for various machines, and similarly a control tape which transmits control signals to these systems has been developed to make the operation of the machine completely automatic. Generally, the principle of tape control is that a set of holes is punched transversely across a standard width tape for each control signal to be transmitted, and a tape reader is employed to electronically read the location of the holes on the tape and translate this information to coordinate the various operations of the machine. By varying the arrangement of the holes across the tape it is possible to electronically describe the function the machine should perform, one set of holes, of course, communicating one instruction to the machine.

As an illustrative example, the coordination of a tape punch to a tape-controlled milling machine will be described, although it is obvious that this invention may be adapted to efficiently punch tape for any machine. A tape-controlled vertical milling machine is, of course, no different than the ordinary hand-operated milling machine in general structure, but is provided with an automatic locating table, the movement of which is controlled by the information conveyed to the machine by the punched tape. The tape control operation of the milling machine is limited to movement of the table in an $x$—$x$, $y$—$y$ plane of operation and further operations, such as drilling, are automatically set in motion after the table has moved to an $x$, $y$ coordinate position. Using a system of coordinates any location on a work-piece may be located. The controlled machine and the tape reader, which translates the control signals of the tape for the machine, are constructed to recognize the first block of information fed into it by the tape as relating to the position the table will move from a zero ordinate position parallel to the $x$—$x$ axis, and the second block of information is automatically understood to call out the movement of the table in a line parallel to the $y$—$y$ axis after response to the ordinate along the $x$—$x$ axis. By punching the tape to correspond to predetermined coordinate points as determined from the piece part drawing, the location of any hole or other machine process will be located directly under the spindle of the milling head.

In the past users of these machines have always been faced with the problem of not only spending large amount of money for a machine and tape reader, but have had also to purchase an equally important tape punching mechanism. In general, these punching mechanisms have taken the form of an electrically powered keyboard of some sort which transfers the information punched thereon to a tape perforating section of the machine which, of course, punches the tape with the corresponding information. Generally, these keyboard type tape punchers require a somewhat skilled operator who is not only familiar with the operation of the puncher but is also familiar with the necessary sequence of machining operations and therefore must be able to interpret drawings such that the most economical sequence of operations will be fed into the machine. All of these punching machines, however, as an end result punch a tape that will control the table of the machine only; the other individual movements of the machine, as previously stated, will not be controlled by the tape but rather be controlled by the stoppage of the table after it has moved to the designated machining spot as indicated from the tape.

For the sake of simplicity, this description is given in reference to what is termed one inch-eight channel tape which refers to tape one inch wide upon which eight channels or holes may be punched transversely thereacross which are used to convey signals from the tape reader to the control machine by arranging the holes of the tape in any predetermined combination. For standardization purposes these combination usually are all odd or all even, that is to say, that in any information block either an odd number of channels will be opened by punching or an even number will be used.

When using eight channel tape these various combinations will include a delete signal which is used to erase any errors that may be punched into the tape; an end-of-block signal which indicates to the machine that it has been informed of the $x$ and $y$ coordinates and should correspondly move to these points; a tab signal which tells the machine to tabulate or memorize the following information; a minus signal which indicates to the machine to move negatively of the point of origin of the $x$—$y$ axis; a plus signal which informs the machine conversely to move positively from the $x$—$y$ origin; a plurality of numerical signals 1, 2, 3, 4, 5, 6, 7, 8, 9 and 0 which, of course, enable the conveyance of any numerical location; a rewind signal which will rewind the tape at the end of of a completed sequence of operation to the starting point; a rewind stop signal which will stop the rewind of the tape after it has returned to the starting point and a tool change signal which actually throws the machine out of automatic operation such that it will be turned off when the operator wishes to change a tool. Further, the tape is automatically punched with a series of sprocket holes which allow the tape to be advanced uniformly through the tape reader. The numerical signals placed on the tape allow any combination of numbers to be conveyed to the machine. As these machines are ordinarily responsive to and are based upon numerals of $\frac{1}{1000}$ of an inch, all numerical signals are composed of a number containing no decimal places but is rather based on a $\frac{1}{1000}$ figure number. Therefore, to convey the number $4\frac{1}{2}$ to the machine, it would be necessary to punch the signals corresponding to 4, 5, 0 and 0. This would tell machine to advance $^{4500}\!/_{1000}$ or 4.5 inches.

It is a specific object of this invention to provide a hand-operated machine which will efficiently punch control tape and which will provide a unique economical punching method which is designed to convert all the necessary information for operation of a tape-controlled machine into symbols which the machine is able to understand.

It is a specific object of my invention to provide a hand-operated tape punching machine capable of signal selection and transfer of these signals to a control tape.

It is a specific object of this invention to provide a hand-operated tape punching mechanism which will properly and securely advance the tape being punched such that the signals will be placed upon the tape at predetermined intervals and the tape punching thereby will be operative in the standard system of tape readers used in reading, translating and conveying this information into control signals for a tape controlled machine.

It is a further specific object to provide a pivotally mounted lever member whereupon a rotatably mounted cylinder is provided and in which cylinder a plurality of striking pin members are arranged to radially extend therefrom and are arranged in sets circumferentially therearound to register with a plurality of tape perforating pin members directly therebelow such that when the lever is actuated in a downward direction the corresponding perforating pins will be urged downwardly corresponding to the arrangement of the striker pins in any one set so as to punch a series of signal holes transversely across the tape as it moves therebelow.

It is a further specific object to provide a tape advance mechanism of this invention in cooperating engagement with said actuating lever such that upon the return of said lever to a normal position, the advancing mechanism will advance the control tape a predetermined distance.

It is another specific object to provide a direction control means on the operational lever of a tape punching mechanism such that whenever downward punching motion of the lever has been initiated, the downward motion must be continued until the tape punching operation has been completed and thereby preventing the lever from returning to its normal upraised position without properly perforating the tape.

It is a further specific object of this invention to provide a plurality of stripping means directly underlying a guideway of the control tape such that when the perforating pins have passed therethrough said stripping means will remove the punched out portion of the tape from the perforating pins, thereby insuring a cleanly punched hole in the tape.

It is a specific object of this invention to provide a signal selector means which will enable the operator to select a desired signal to be punched into the tape and to arrange the striker pins corresponding to this signal in direct overhead alignment with the perforating pins so as to maintain this alignment during the punching operation, thus insuring correct punching sequence.

Further advantages of this invention will appear to those skilled in the art from the following detailed description taken with the accompanying drawings, in which.

FIG. 1 is a side elevation of the tape punching mechanism;

FIG. 2 is a plan view of the invention further showing the unpunched tape entering the machine and the punched tape leaving the same;

FIG. 3 is a sectional view taken substantially along line 3—3 of FIG. 1 illustrating the control signals used by this type punch;

FIG. 4 is a rear view of the invention;

FIG. 5 is a partial section of the invention taken substantially along line 5—5 of FIG. 1;

FIG. 6 is a partial section taken substantially along line 6—6 of FIG. 4;

FIG. 7 is a partial section taken substantially along line 7—7 of FIG. 2 showing the internal indexing system for the pin selection;

FIG. 8 is a partial section taken substantially along line 8—8 of FIG. 1 drawn to a larger scale in which the operating lever is in a tape punching position;

FIG. 9 is a partial section taken substantially along line 9—9 of FIG. 1 particularly showing the tape hold-down mechanism;

FIG. 10 is a partial section taken substantially along line 10—10 of FIG. 1 showing the tape advance mechanism; and FIG. 11 is a portion of the control tape as it may be punched by the mechanism.

In punching automatic control tape A, it is necessary to provide a tape perforating section generally designated 10, a signal selector arrangement generally designated 11 and a tape advancing mechanism generally designated 12. As shown in the accompanying drawings, a base support plate 13 is arranged for the support and attachment of all the necessary components of the invention, and in the form shown the perforating section 10 is held on one end thereof by any appropriate fastening means. The tape perforating section includes a pair of cooperating die blocks, the upper block designated 14 and the lower 15, with a tap guiding channel 16 formed therebetween which, in the form shown, comprises a milled slot of sufficient width arranged on the bottom surface 14a of the upper die block 14 and extends completely thereacross. This channel 16, of course, is provided to be of the same width as the tape A being punched and of a sufficient depth to allow the tape to slide unretarded therethrough.

A plurality of perforating pins 18 are arranged to pass through a plurality of selectedly fit guiding openings 14b arranged in the upper die block 14 normal to the tape guiding slot 16 and arranged transversely thereacross. The lower die block 15 is rigidly attached to the upper die block 14 by suitable fasteners such as pins and bolt and, in the form shown, is provided with a plurality of aligned openings 15a directly underlying the openings 14b of the upper die block 14, such that when the perforating pins 18 are depressed downwardly they will pass therethrough and thereby perforate the tape A. A die block base 20 is provided below the joined die blocks 14 and 15 for mounting the same to the base plate 13 and in the form shown is provided with a plurality of openings 20a directly underlying the perforating openings of the upper connected die block. A cavity or punch collecting opening 20b is formed in the base block 20 communicating with the openings 20a such that the confetti resulting from punching the tape will collect therein for easy cleaning and to further insure that the perforating pins 18 will not collect any of the punched material on the perforating end 18a. It should be obvious that the correct size opening 15a in the lower die block 15 will serve to strip the punched-out tape portion from the piercing end 18a of the pins 18.

In order to actuate the perforating pins 18 into tape punching position, a signal selector and actuating lever assembly generally designated 25 is pivotally mounted on the stub shaft 26 and, in the form shown, the stub shaft 26 is arranged within a passage 27b through a base plate extension 27 which extends upwardly from the base plate 13 and said extension 27 is provided with a bearing surface 27a upon which the actuating lever assembly 25 may rotate so that the operation thereof will be maintained in a vertical plane. In the form shown, the stub shaft 26 extends from the base plate extension 27 and is in press-fit relation therewith and is also provided with an abutting shoulder 26a formed by an enlarged portion of the stub shaft 26 which prevents the passage of the stub shaft 26 through the support base extension 27.

In the form shown and as best illustrated in FIGS. 1 and 2, the actuating lever assembly 25 includes a pivot block 28 which pivots about the stub shaft 26 and is held thereon by a cap screw assembly generally designated 26b such that the pivot block 28 will be held in constant contact with the support base bearing surface 27a. A return spring-engaging member 28a is provided rearwardly of the pivot shaft 26 and, in the form shown, is provided with an extension spring 29, one end of which passes through an opening 28b of the engaging member 28a and the other end is firmly attached to the support base 13. The spring 29, of course, returns the actuating lever assembly 25 to a normal first position. An adjustable stop means such as the threaded rod 28c and nut 28d are provided in the base plate 13 below the pivot block 28 so as to limit the return stroke of the block 26.

In the form shown and clearly illustrated in FIG. 7, this actuating lever 25 also includes a striker pin selecting mechanism which, in the form shown, comprises a substantially short indexing shaft member 30 which is rotatable within a passage 28e of the pivot block 28 and is maintained within the block 28 by providing a cap screw and washer assembly 31 on one end 30b thereof in abutting relationship with the pivot block member 28. The other end 30a of said indexing shaft 30 extends outwardly from said pivot block 28 such that another member may be easily attached thereto. An indexing arrangement is arranged on the inwardly disposed end 30b of said shaft 30 and, in the form shown, comprises a spline system with land 30c and groove 30d members arranged longitudinally about the periphery of the shaft 30 and includes a spring-loaded shot pin assembly which, in the form shown, comprises a beveled shot pin 32 slidingly arranged with a passage 28g in the pivot block 28 and a shot pin spring 32a arranged directly therebelow, such that the shot pin and spring assembly may be held therein by a set screw 32b. The purpose of the shot pin 32 and spring 32a assembly is, of course, to engage with the grooves 30d of the indexing shaft 30 and hold the same in one of several predetermined positions. An actuating handle member 35 is removaly attached to the outwardly extending end of the indexing shaft 30a and, in the form shown, receives said outward end 30a into a closed passage 35a in one end thereof and is held thereto by a set screw 35b in engagement therewith.

A plurality of striker pins 36 are arranged to extend radially from said operating handle 35 and, in the form shown, are pressed into proper size openings 36a extending radially from said closed passage 35a. By arranging the pins 36 to extend outwardly from the passage 35a it is possible to replace any pin 36 that may be broken by simply removing the handle 35 and pressing the same inwardly into the passage 35a so it may be removed therefrom. As best shown in FIG. 1, these pins 36 are arranged in predetermined sets longitudinally along the axis of said operating handle 35 and a plurality of such sets are arranged circumferentially around the operating shaft 35. The number of sets of pins which will be arranged circumferentially around the operating handle, of course, will be determined by the number of signals necessary to control the machine for which the tape is being punched. In the example described and as best shown on the locating dial 37 in FIG. 3, the signals necessary in this operation include a DEL signal, a RWST signal, a — signal, a + signal and numerical signals 0, 1, 2, 3, 4, 5, 6, 7, 8 and 9, an EOB signal and a RW signal. The number of striker pins 36 in any set, of course, is predetermined and conforms to the machine upon which the tape is to be used. As best shown in FIGS. 1 and 3, an indexing dial 37 corresponding to the various sets of pins on the operating handle 35 is arranged intermediate the ends of the handle and is provided with a written or numerical description of each set. Further, this selection system also includes a locating point 38 which, in the form shown, comprises a portion of a support arm 38a mounted on the pivot block 28 and extends therefrom to closely overlie the dial 37, such that when any signal is aligned with the locating point 38 the proper set of pins 36 will be moved into proper striking position, such that when the lever 35 is pushed downwardly, they will abut with the tops 18b of the perforating pins 18 so as to drive the same downwardly through the control tape.

To insure complete punching of a signal into the tape A and prevent the handle 35 from returning to a normal upright position without punching the tape, a ratchet and pawl system is arranged to cooperate with the pivot block 28 and the base plate extension 27. In the form shown and as best illustrated in FIG. 2, a pawl 33 is pivotally mounted on the support base extension 27 and cooperates with a ratchet arrangement which comprises a series of angular sided notches 34 and a clearance opening 34a on the adjacent side of the pivot block 28. In operation of the handle 35 downwardly the pawl 33 will closely override the notches 34 but is so designed to interfere with the bottom of any notch should the movement of the handle 35 be changed to an upward direction. When the downward movement of the handle 35 moves the clearance opening 34a in relation to the pawl 33, the pawl 33 may now swing therein such that upward movement of the handle 35 may now be effected. This, of course, corresponds to a time when the perforating pins 18 have completely passed through the tape A. Upward movement of the handle 35 now urges the pawl against the pawl spring 33a such that when the last of the notches has moved past the extending end of the pawl 33 it will be urged to its first position. This mechanism insures that the operator will completely punch the tape once he initiates downward motion of the handle 35.

Although the code and arrangement of the signals may vary from machine to machine, a selection of striker pins 36 which will generate the proper signals for one specific machine will be described, and it should be understood that this signal arrangement may be changed to fit any machine.

As previously indicated, eight channel tape means that a maximum of eight signal holes may be punched transversely across the tape at any one location and, of course, the various signals are made up of the several combinations available by using any number of these eight. For example, should the operator wish to punch the tape with the signal RW, which means rewind, he will rotate the operating handle 35 so as to align the symbol RW with the line 38 on the selector dial 37. This will then locate a set of pins 36 corresponding to holes 1, 5 and 6 in the tape in proper position to register with the perforating pins 18 and when the handle 35 is operated will punch the tape accordingly. Further, on any punching operation it is necessary to provide an advance pin which will punch a hole in the tape for engagement with a tape feed spocket wheel of the tape reader. In this form the feed sprocket hole is located between the 3rd and 4th channel holes, numbering of the striking 36 and perforating 18 pins being from the front as the operator faces the dial 37 rearward, and no matter what operating signal is punched, this pin will always be in registering and tape punching position.

It should now be obvious that a definite relationship exists between the selector handle 35 and the indexing shaft 30 in that the number of indexing grooves and splines 30c and 30d on the indexing end 30b thereof must correspond to the number of signals or sets of striker pins 36 such that upon rotation of the handle 35 the detent pin 32 will hold the shafts 30 and 35 and thus striking pins 36 in proper abutting relation to the perforating pins 18.

As shown in FIG. 8, a plurality of stripper springs 40 are arranged near the top 18b of each of the perforating pins 18 to engage therewith such that after depression and subsequent upward movement of the operating handle 35, the stripper spring 40 will pull the perforating pin 18 upward from the bottom die block 15 through the tape channel 14a and into a normal first position.

As further shown in FIG. 7, a rotation stop member 41 is arranged in vertical alignment with the rotational plane of the lever 35 to limit its downward movement and therefore prevent undue stress being placed upon the stripper springs 40. In the form shown the stripper springs 40 are held by a pair of cooperating clamp members 40a and 40b with a clamping member, such as a screw 40c, inserted therethrough to pass into a tapped hole 14b in the upper die block.

In addition to the punching mechanism a tape advancing mechanism is provided. In the form shown this mechanism cooperates with the pivotal lever assembly 35 such when the lever 35 is returned to a raised position after punching a set of holes, the tape will automatically be advanced a proper amount which is, when using eight channel tape, $\frac{1}{10}$ of an inch.

For tape advancement, as best shown by FIG. 1, a ratchet 45 and pawl 46 mechanism is arranged to drive a tape advancing shaft 47 which, in the form shown, is provided with a tape engaging sprocket wheel 48 which drives the tape through the punched sprocket drive holes. The sprocket 48 is provided with tine members 48a which cooperate with said holes to pull the tape A the proper distance ($\frac{1}{10}$ in.) through the tape guide 14a so as to position the tape for the next punching operation. In the form shown the pawl 46 is pivotally mounted on the pivot block 28 by means such as a cap screw 46a and, as best shown in FIG. 10, the pawl 46 is an overriding driving member which engages a drive shoulder 28f of the pivot block 28 when the block 28 and lever 35 return to the normal upright position and, of course, is inoperative when the lever 35 is actuated downward into punching position. On the downward stroke the pawl is moved into operative position by the pawl spring 46b which raises the pawl 46 so as to be in line with one notch 45a of the racket member 45.

In the form shown, a positive locating device generally designated 50 is further provided to make up for any inaccuracies that may result in the ratchet and pawl system. In this form, the internal structure of which is illustrated in FIG. 6, an indexing plate member 51 is fixedly attached to the tape advance shaft 47 and is provided with a plurality of locating indentations 51a located circumferentially therearound. The number of indentations 51a in this case is 20 which corresponds to the number of drive fingers on the ratchet member 45. An outboard bearing 52 is provided to rotatably contain one end of the tape advance shaft 47 and is fixedly attached to the base support plate 13. A shot indexing pin member 53 is further provided within the support member 52 and is arranged in cooperating relationship with the indentations 51a of the indexing plate 51. A spring member 54 is arranged directly behind the indexing pin and is rotatably attached to the shaft support 52 by means such as a screw 52a and when in operating position behind said pin 53 will urge the pin into the nearest indentation 51a so as to properly locate the attached advancing shaft 47. The spring member 54 is rotatable about its attachment point such that it may be shifted out of engagement with the rear of the indexing pin 53 by the handle means 55. In the form shown and as best illustrated in FIG. 4, the handle means is slidably contained within an extension 52b of the shaft support 52 and wherein the lower end is provided with capturing means 55a on either side of the spring member 54 such that the spring 54 may be lifted out of indexing pin 53 urging position as illustrated in FIG. 4.

As further illustrated in FIG. 4, a pin camming tab 54a is provided on the spring 54 and is bent slightly from the normal plane of said spring such that when the spring 54 is pushed downward into operative position, it will serve to cam the spring 54 over the indexing pin 53. The releasable spring member 54 is, of course, essential to provide for free rotation of the tape advancing shaft 47 and sprocket wheel 48 and hence free advance of the tape A through the guideway 14a.

To facilitate free advance or to manually advance the tape A, a knob member 56 is fixed to the other end of the tape advance shaft 47 and in the form shown is arranged outwardly from the front support 52b of the shaft 47. By shifting the spring means 54 into inoperative position, thus releasing the pressure on the indexing pin 53, the shaft 47 and sprocket wheel 48 may be rotated by the knob 56 to freely advance the tape.

As illustrated in FIG. 9, a tape hold-down mechanism 60 is provided to generally overlie the sprocket driving wheel 48 of the tape advance shaft 47 and is provided with an arcuately formed section 60a such that it will closely overlie said sprocket driving portion to insure positive movement of the tape A by the sprocket wheel 48 in that a greater number of sprocket tines 48a till register with sprocket feed holes in the feed holes in the tape. In the form shown the tape hold-down member 60 is pivotally mounted on the upper die block 14 and is in cooperative contact with a hold-down coil spring 62 which is attached to the die block support member 20. One end 62a of the hold-down spring 62 cooperates with a tab 60b of the hold-down member such that when the hold-down member 60 is in position over the tape, the spring 62 will exert sufficient pressure thereon to insure positive registration of the tines 48a with the tape drive holes. A tape delivery lip 63 is provided on the support base 13 such that it will strip the now perforated tape from the sprocket drive wheel 48.

In operation of the invention it will, of course be understood that in actual use the tape would be punched to correspond to the specific dimensions for a specific part. This operational discussion will not be limited to any specific part but will rather entail the many functions covered by this mechanism.

In order to properly start punching a control tape, the tape is naturally inserted into the tape-guiding slot 16 and may be pushed therethrough such that the end overlying the sprocket wheel 48 may extend therefrom so as to be easily grasped by hand. At this time the tape hold-down mechanism 60 may be pressed onto the tape such that the tines 48a of the sprocket wheel 48 will pierce therethrough so as to positively grasp the tape. The indexing camming handle 55 is then placed in its downward position such that the spring 54 will urge the indexing pin 53 into the indentation 51a of the indexing plate 51 and thus insure proper increments of tape advance. It should be noted that initial advancing and positioning of the tape may be accomplished by rotating the tape advance shaft knob 56 in a counterclockwise direction. At this point the tape is in position for the punching operation. It is customary to provide the initial portion of the punched tape with a series of delete signals, indicated DEL on the positioning dial. This delete position indexes striker pins 1 through 7 and the feed sprocket pin in registering position such that when the operating handle 35 is pushed downwardly, these pins will register with the respective perforating pins 18, which will, of course, be forced through and punch holes in the control tape. DEL is also used as an erasing method should an error be punched into the tape.

Upon release of the handle 35 such that it will be returned to a first normal position by the return spring 29, the pawl 46 will abut with the drive shoulder 28f of the drive block 28 and the driving end of the pawl 46 will engage with an extending arm element of the ratchet member 45. This movement, of course, will serve to urge the ratchet 45 and connected tape advance shaft 47 in a counterclockwise direction which is transmitted to the tape through the sprocket drive wheel 48 whose tines 48a are engaged with the feed sprocket holes now punched into the tape. To advance the tape the proper increment, an indexing plate 51 is also connected to the tape advance shaft 47 and is provided with properly spaced indentations 51a and a detent indexing pin 53 which will cooperate with the ratchet wheel 45 such that when the ratchet coarsely indexes the tape advance shaft 47, the pin 53 will be urged into the nearest hole and thus complete rotation of the shaft 47 to the desired position.

As previously discussed, the pawl 33 and ratchet 34 governing the movement of the pivot block 28 will not allow the return of the handle 35 to an upright position unless the downward punching movement has been completed. This prevents advance of the tape through the puncher without a signal being forgotten or only partially punched.

A portion of the tape is illustrated in FIG. 11 and it is obvious that in any punching operation the feed holes designated by the symbol B are always punched no matter what combination of signals is being punched onto the tape.

The next desired signal usually punched into the tape would be that of the rewind stop indicated by the symbols RWST on the indicating dial 37. When this signal is arranged with the point 38 the set of striker pins 36 corresponding to the track holes 1, 2, 4, 5 and 7 are arranged to register with the perforating pins 18. The purpose of this signal is to stop the rewind of the tape after a machining operation is completed and recycling is desired. The next signal is that of TAB, which indicates to the machine that it should memorize the following block of information. The TAB signal will punch track holes 2, 3, 4, 5 and 6 and, of course, brings the proper set of striker pins 36 into proper registering position with the perforating pins 18.

The next signal will be the direction the machine will move along the *x* axis in either a positive or negative direction. This, of course, is accomplished by rotating the dial 37 to either the + or — sign, either of which will locate the proper set of striking pins to convey such information to the machine.

The next block of information will comprise a series of numbers and, as previously indicated, since the tape controlled machine herein described recognizes numbers based on .001, although the invention is adaptable to punch tape for machines which recognize other base amounts, the group of numbers will be so picked as to represent the total thousandths corresponding to the desired dimension. Therefore, the dimension 2.932 inches would actually be punched by rotating the indicating dial to punch the sequence of numbers 2932 informing the machine to move 2,932 thousandths.

The next signal punched will be a repeat of the above but the machine will automatically recognize this to represent the required movement along the *y* axis again in the direction indicated by a + or — sign and a series of numbers. The next information group is the EOB designation which means that the proper information has been conveyed to the machine and it should now proceed to the designated position.

If this is the final machining process, the rewind RW indication is then punched into the tape and the tape will rewind itself automatically to the rewind stop. The only remaining signal is that the tool change which is self-explanatory and is the only signal that will serve to throw the machine out of automatic control so the operator will not be in danger due to changing the tool while the machine may be operating.

It is obvious from reading the operational description contained herein that the tape will automatically be advanced after every signal is punched into the tape and although a few examples of striker pin sets have been described, it is obvious that the arrangement of these sets may be varied to meet the demands of the machine. For instance, should a machine require a TAB signal responsive to holes 1, 2, 3 in the tape, the pin position may be so altered as to meet this requirement.

It should be obvious that although this signal selector system is arranged to punch only the signals necessary in eight channel tape, that the size and structure may be easily altered and pin arrangements changed such that any size tape or any number of signals may be easily punched. This, of course, is only governed by the circumferential spacing necessary to index the operating lever and, of course, the spacing necessary to permit the proper circumferential spacing of the striker pins 36 around the handle 35. It should also be obvious that although this invention embodies a pivoting lever principle for tape punching actuation, this same result could be obtained by a straight line mechanism in which the perforating pins would be placed directly on the actuating bar, thus allowing the striker pins to be eliminated.

Although the disposition of the operating handle 35 is in a slightly inclined position, it could be arranged in any desired direction by simple arranging of the support base 13 as an inclined plane or by any of several similar methods.

In designing this tape punching mechanism it was found necessary to provide different materials and material hardening processes for various pieces, such as the perforating and striking pins, the ratchet and pawl arrangement and the indexing mechanism. It is, of course, understood that various other materials could be used to perform these same functions without departing from the scope of this invention.

It may be seen that this invention provides a simple, unique and inexpensive method of punching control tape for an automatic machine and is operable without requiring a specially trained operator in that the operational aspects are simple and obvious.

It will, of course, be understood that various changes may be made in the form, details, arrangements and proportion of parts without departing from the scope of the invention, which generally stated consists in the matter set forth in the appended claims.

What I claim is:

1. Apparatus for punching electronic control tape and the like, said apparatus comprising a support base, a plurality of perforating pins, a lever housing member swingably mounted on said base, an actuating lever removably arranged in said housing and rotatable therein about its longitudinal axis into a plurality of predetermined positions, handle means removably secured to said lever, a plurality of striking pin sets extending radially outward from said handle and arranged longitudinally therealong with the sets being respectively spaced around said handle corresponding to said predetermined lever positions to register with said perforating pins when the handle is shifted into actuating position, indicatng means on said handle to indicate the set of striking pins disposed in registering relation to said perforating pins for punching therewith, means defining a tape positioning and guiding path below said perforating pins and tape advance means for positively advancing said tape responsive to the movement of said actuating handle.

2. The structure as set forth in claim 1 wherein said handle is provided with a lever receiving recess and said striking pins are positioned radially outwardly from said recess to facilitate removal thereof should any of said pins require replacement.

3. Apparatus for punching electronic control tape and the like, said apparatus comprising a support base, a plurality of perforating pins, a lever housing member swingably mounted on said base, an actuating lever removably arranged in said housing and rotatable therein about its longitudinal axis into a plurality of predetermined positions, a plurality of striking pin sets removably secured to said lever extending radially outward from said lever and arranged longitudinally therealong with the sets being respectively spaced around said lever corresponding to said predetermined lever positions to register with said perforating pins when the lever is shifted into actuating position, indicating means on said lever to indicate the set of striking pins disposed in registering relation to said perforating pins for punching therewith, means defining a tape positioning and guiding path below said perforating pins and tape advance means for positively advancing said tape responsive to the movement of said actuating lever.

4. Apparatus for punching electronic control tape and the like, said apparatus comprising a support base, a plurality of perforating pins, a lever housing member swingably mounted on said base, an actuating lever removably arranged in said housing and rotatable therein about its longitudinal axis into a plurality of predetermined positions, handle means removably secured to said lever, a plurality of striking pin sets removably secured to and extending radially outward from said handle and arranged longitudinally therealong with the sets being respectively spaced around said handle corresponding to said predetermined lever positions to register with said perforating pins when the handle is shifted into actuating position, indicating means on said handle to indicate the set of striking pins disposed in registering relation to said perforating pins or punching therewith, means defining a tape positioning and guiding path below said perforating pins and tape advance means for positively advancing said tape responsive to the movement of said actuating handle.

5. An improvement for electronic control tape punching apparatus and the like which punching apparatus comprises at least a support base, a plurality of perforating pins in punching position within said support base, a guide path positioned to be in punching relation to said perforating pins for guiding the tape to be punched and an actuating lever swingably mounted on said base and rotatable therein about its longitudinal axis into a plurality of predetermined positions, said improvements including a plurality of striking pin sets removably secured to and extending radially outward from said lever and arranged longitudinally therealong with the sets being respectively spaced around said lever corresponding to said predetermined lever positions to register with said perforating pins when the lever is shifted into actuating position to register, with said perforating pins for punching therewith.

6. Apparatus for punching electronic control tape and the like, said apparatus comprising a support base, a plurality of perforating pins, a lever housing member swingably mounted on said base, an actuating lever arranged in said housing and rotatable therein about its longitudinal axis into a plurality of predetermined positions, handle means removably secured to said lever, a plurality of striking pin sets extending radially outward from said said handle and arranged longitudinally therealong with the sets being respectively spaced around said handle corresponding to said predetermined lever positions to register with said perforating pins when the handle is shifted into actuating position, indicating means on said handle to indicate the set of striking pins disposed in registering relation to said perforating pins for punching therewith, means defining a tape positioning and guiding path below said perforating pins and tape advance means for positively advancing said tape responsive to the movement of said actuating handle.

References Cited by the Examiner
UNITED STATES PATENTS

| | | | |
|---|---|---|---|
| 433,003 | 7/1890 | Hill | 234—100 |
| 486,858 | 11/1892 | Cummins | 234—100 |
| 964,951 | 7/1910 | Ball | 234—1 |
| 1,159,694 | 11/1915 | Marck et al. | 234—1 |
| 1,429,719 | 9/1922 | Day | 234—100 X |
| 1,757,914 | 5/1930 | Long | 234—100 |
| 2,258,641 | 10/1941 | Below | 234—100 |
| 2,800,181 | 7/1957 | Taynton et al. | 234—100 |
| 2,878,870 | 3/1959 | Zum Bahlem et al. | 234—100 X |
| 2,993,642 | 7/1961 | Fender et al. | 234—99 X |
| 3,063,622 | 11/1962 | Nold | 234—100 |

WILLIAM W. DYER, Jr., *Primary Examiner.*

J. SPENCER OVERHOLSER, ANDREW R. JUHASZ,
*Examiners.*